(12) United States Patent
Ono et al.

(10) Patent No.: US 10,612,146 B2
(45) Date of Patent: Apr. 7, 2020

(54) ELECTROCHEMICAL REACTION DEVICE

(71) Applicant: Kabushiki Kaisha Toshiba, Minato-ku (JP)

(72) Inventors: Akihiko Ono, Kita (JP); Satoshi Mikoshiba, Tamato (JP); Ryota Kitagawa, Setagaya (JP); Jun Tamura, Chuo (JP); Yoshitsune Sugano, Kawasaki (JP); Arisa Yamada, Kawasaki (JP); Yuki Kudo, Yokohama (JP)

(73) Assignee: Kabushiki Kaisha Toshiba, Minato-ku (JP)

(*) Notice: Subject to any disclaimer, the term of this patent is extended or adjusted under 35 U.S.C. 154(b) by 0 days.

(21) Appl. No.: 16/169,422

(22) Filed: Oct. 24, 2018

(65) Prior Publication Data

US 2019/0062935 A1 Feb. 28, 2019

Related U.S. Application Data

(63) Continuation of application No. 15/259,466, filed on Sep. 8, 2016, now abandoned.

(30) Foreign Application Priority Data

Mar. 18, 2016 (JP) .................. 2016-054732

(51) Int. Cl.
*C25B 9/10* (2006.01)
*C25B 1/00* (2006.01)
(Continued)

(52) U.S. Cl.
CPC ................ *C25B 9/10* (2013.01); *C25B 1/003* (2013.01); *C25B 1/10* (2013.01); *C25B 15/08* (2013.01); *Y02E 60/366* (2013.01)

(58) Field of Classification Search
CPC .. C25B 3/04; C25B 9/10; C25B 1/003; C25B 1/10; C25B 15/08; Y02E 60/366
See application file for complete search history.

(56) References Cited

U.S. PATENT DOCUMENTS 3,657,101 A 4/1972 Fox
4,897,167 A 1/1990 Cook
(Continued)

FOREIGN PATENT DOCUMENTS

JP 2010-53425 3/2010
JP 2010-255018 11/2010
(Continued)

OTHER PUBLICATIONS

Steven Y. Reece et al. "Wireless Solar Water Splitting Using Silicon-Based Semiconductors and Earth-Abundant Catalysts", Science, vol. 334, Nov. 4, 2011, 5 pages.

*Primary Examiner* — Ciel P Thomas
(74) *Attorney, Agent, or Firm* — Oblon, McClelland, Maier & Neustadt, L.L.P.

(57) ABSTRACT

An electrochemical reaction device, includes: an electrolytic solution tank including a first storage part to store a first electrolytic solution containing carbon dioxide, and a second storage part to store a second electrolytic solution containing Water: a reduction electrode disposed in the first storing part; an oxidation electrode disposed in the second storing part; a porous both disposed in the first storing part; and a flow path connecting the porous body and an outside of the electrolytic solution tank to supply gas containing carbon dioxide to the porous body.

7 Claims, 9 Drawing Sheets

(51) Int. Cl.
*C25B 1/10* (2006.01)
*C25B 15/08* (2006.01)

(56) References Cited

U.S. PATENT DOCUMENTS

| | | | |
|---|---|---|---|
| 2010/0193370 A1 * | 8/2010 | Olah | C07C 29/1518 |
| | | | 205/450 |
| 2011/0114502 A1 | 5/2011 | Cole | |
| 2012/0298521 A1 | 11/2012 | Richardson | |
| 2013/0186771 A1 | 7/2013 | Zhai et al. | |
| 2013/0287636 A1 | 10/2013 | Shitara | |
| 2015/0190565 A1 | 7/2015 | Ohdaira | |
| 2018/0023198 A1 * | 1/2018 | Graetzel | C25B 11/0452 |
| | | | 205/391 |

FOREIGN PATENT DOCUMENTS

| | | |
|---|---|---|
| JP | 2011-94194 | 5/2011 |
| JP | 2013-544957 | 12/2013 |

* cited by examiner

ELECTROCHEMICAL REACTION DEVICE

CROSS-REFERENCE TO RELATED APPLICATION

This application is a Continuation of U.S. application Ser. No. 15/259,466 filed Sep. 8, 2016, and is based upon and claims the benefit of priority from Japanese Patent Applications No. 2016-054732, filed on Mar. 18, 2016; the entire contents of all of which are incorporated herein by reference.

FIELD

Embodiments described herein relate generally to an electrochemical reaction device.

BACKGROUND

In recent years, there has been developed an artificial photosynthesis technology which electrochemically converts sunlight into chemical substances by modeling photosynthesis of plants from viewpoints of energy problems and environmental problems. This is because even if the sunlight is converted into chemical substances at a land that is low in utility value such as a desert and is not used for production of plants and then transported to a place away therefrom, enough energy can be obtained. When the sunlight is converted into the chemical substances and stored in a cylinder or a tank, there are advantages that the energy storage cost can be reduced and the amount of storage loss is small as compared to a case where the sunlight is converted into electricity and stored in a storage battery.

As a photoelectrochemical reaction device that electrochemically converts sunlight to a chemical substance, there has been known, for example, a two-electrode type device that includes an electrode having a reduction catalyst for reducing carbon dioxide ($CO_2$) and an electrode having an oxidation catalyst for oxidizing water ($H_2O$), and in which these electrodes are immersed in water with carbon dioxide dissolved therein. In this case, the electrodes are electrically connected via an electric wire or the like. In the electrode having the oxidation catalyst, $H_2O$ is oxidized by light energy, whereby oxygen ($\frac{1}{2}O_2$) is obtained and a potential is obtained. In the electrode having the reduction catalyst, by obtaining the potential from the electrode, in which the oxidation reaction is caused, carbon dioxide is reduced and formic acid (HCOOH) or the like is produced. As described above, in the two-electrode type device, the reduction potential of carbon dioxide is obtained by two-stage excitation, and therefore the conversion efficiency from the sunlight to chemical energy is low.

DETAILED DESCRIPTION

An electrochemical reaction device in an embodiment, includes: an electrolytic solution tank including a first storage, part to store a first electrolytic solution containing carbon dioxide, and a second storage part to store a second electrolytic solution containing water; a reduction electrode disposed in the first storing part; an oxidation electrode disposed in the second storing part; a porous body disposed in the first storing part; and a flow path connecting the porous body and an outside of the electrolytic solution tank to supply gas containing carbon dioxide to the porous body.

Hereinafter, embodiments will be described with reference to the drawings. Note that the drawings are schematic and, for example, dimensions such as thickness and width of components may differ from actual dimensions of the components. Besides, in the embodiments, substantially the same components are denoted by the same reference signs and the description thereof will be omitted in some cases. A term of "connect" in the specification is not limited to a case of connecting directly but may include a meaning of connecting indirectly.

Figure 1:
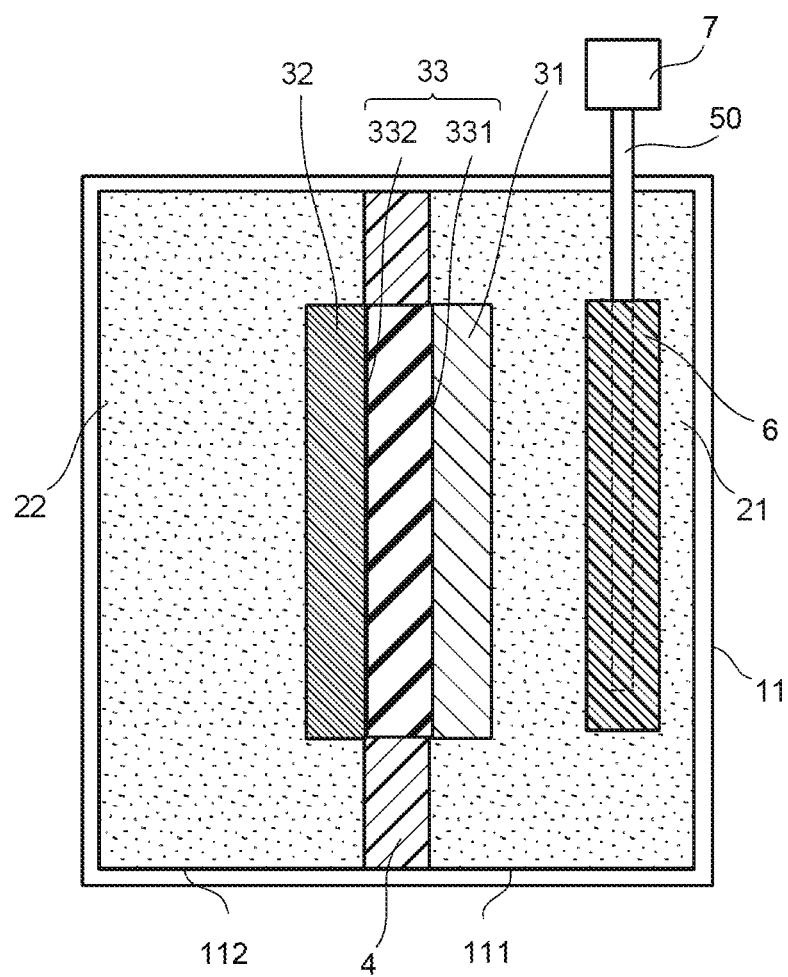
FIG. 1 is a schematic view illustrating a configuration example of an electrochemical reaction device.

FIG. 1 is a schematic view illustrating a configuration example of an electrochemical reaction device. The electrochemical reaction device includes, as illustrated in FIG. 1, an electrolytic solution tank 11, a reduction electrode 31, an oxidation electrode 32, a photoelectric conversion body 33, an ion exchange membrane 4, a porous body 6, and a flow path 50.

The electrolytic solution tank 11 has a storage part 111 and a storage part 112. The shape of the electrolytic solution tank 11 is not particularly limited as long as it is a solid shape having cavities being the storage parts. As the electrolytic solution tank 11, for example, a material transmitting light is used.

The storage part 111 stores an electrolytic solution 21 containing a substance to be reduced. The substance to be reduced is a substance that is reduced by a reduction reaction. The substance to be reduced contains, for example, carbon dioxide. The substance to be reduced may further contain hydrogen ions. Changing the amount of water and electrolytic solution components contained in the electrolytic solution 21 can change the reactivity and thereby change the selectivity of the substance to be reduced and the ratio of a chemical substance to be produced.

The storage part 112 stores an electrolytic solution 22 containing a substance to be oxidized. The substance to be oxidized is a substance that is oxidized by an oxidation reaction. The substance to be oxidized is, for example, water, an organic matter such as alcohol or amine, or an inorganic oxide such as iron oxide. The electrolytic solution 22 may contain the same substance as that in the electrolytic solution 21. In this case, the electrolytic solution 21 and the electrolytic solution 22 may be recognized as one electrolytic solution.

The pH of the electrolytic solution 22 is preferably higher than the pH of the electrolytic solution 21. This facilitates migration of hydrogen ions, hydroxide ions and the like. A liquid junction potential due to the different in pH allows oxidation-reduction reaction to effectively proceed.

The reduction electrode 31 is immersed in the electrolytic solution 21. The reduction electrode 31 contains, for example, a reduction catalyst for the substance to be reduced. A compound to be produced by the reduction reaction differs depending on the kind of the reduction catalyst or the like. The compound to be produced by the reduction reaction is, for example, a carbon compound such as carbon monoxide (CO), formic acid (HCOOH), methane ($CH_4$), methanol ($CH_3OH$), ethane ($C_2H_6$), ethylene ($C_2H_4$), ethanol ($C_5H_5OH$), formaldehyde (HCHO), or ethylene glycol; or hydrogen. The compound produced by the reduction reaction may be recovered through, for example, a product flow path. In this event, the product flow path is connected, for example, to the storage part 111. The compound produced by the reduction reaction may be recovered through another flow path.

The reduction electrode 31 may have a structure of for example, a thin-film shape, a lattice shape, a granular shape, or a wire shape. The reduction electrode 31 does not necessarily have to be provided with the reduction catalyst. A reduction catalyst provided outside the reduction electrode 31 may be electrically connected to the reduction electrode 31.

The oxidation electrode 32 is immersed in the electrolytic solution 22. The oxidation electrode 32 contains, for example, an oxidation catalyst for the substance to be oxidized. A compound to be produced by the oxidation reaction differs depending on the kind of the oxidation catalyst or the like. The compound to be produced by the oxidation reaction is, for example, hydrogen ions. The compound produced by the oxidation reaction may be recovered through, for example, a product flow path. In this event, the product flow path is connected, for example, to the storage part 112. The compound produced by the oxidation reaction may be recovered through another flow path.

The oxidation electrode 32 may have a structure of, for example, a thin-film shape, a lattice shape, a granular shape, or a wire shape. The oxidation electrode 32 does not necessarily have to be provided with the oxidation catalyst. An oxidation catalyst provided other than the oxidation electrode 32 may be electrically connected to the oxidation electrode 32.

In the case where the oxidation electrode 32 is stacked on the photoelectric conversion body 33 and immersed in the electrolytic solution 22 and the photoelectric conversion body 33 is irradiated with light via the oxidation electrode 32 to perform the oxidation-reduction reaction, the oxidation electrode 32 needs to have a light transmitting property. The light transmittance of the oxidation electrode 32 is preferably, for example, at least 10% or more of an irradiation amount of the irradiating light to the oxidation electrode 32, and more preferably 30% or more thereof. Not limited to this, but the photoelectric conversion body 33 may be irradiated with light, for example, via the reduction electrode 31.

The photoelectric conversion body 33 has a surface 331 electrically connected to the reduction electrode 31 and a surface 332 electrically connected to the oxidation electrode 32. Note that the photoelectric conversion body 33 does not necessarily have to be provided. Another generator may be connected to the oxidation electrode 32 and the reduction electrode 31. The generator is not limited to the photoelectric conversion element having the photoelectric conversion body. Examples of the generator include a system power supply, a storage battery, or the renewable energy such as the wind power, water power, and the geothermal power. The reduction electrode 31, the oxidation electrode 32, and the photoelectric conversion body 33 are stacked. The reduction electrode 31 is in contact with the surface 331, and the oxidation electrode 32 is in contact with the surface 332. In this case, a slack including the reduction electrode 31, the oxidation electrode 32, and the photoelectric conversion body 33 is also referred to as a photoelectric conversion cell. The photoelectric conversion cell is immersed in the electrolytic solution 21 and the electrolytic solution 22 through the ion exchange membrane 4.

The photoelectric conversion body 33 has a function of performing charge separation by energy of irradiating light such as sunlight. Electrons generated by the charge separation move to the reduction electrode side and holes move to the oxidation electrode side. This allows the photoelectric conversion body 33 to generate electromotive force. As the photoelectric conversion body 33, a photoelectric conversion body of a pn junction type or a pin-junction type can be used. The photoelectric conversion body 33 may be fixed, for example, to the electrolytic solution tank 11. Note that the photoelectric conversion body 33 may be formed by stacking a plurality of photoelectric conversion layers. The sizes of the reduction electrode 31, the oxidation electrode 32, and the photoelectric conversion body 33 may be different from one another.

The ion exchange membrane 4 is provided in a manner to separate the storage part 111 and the storage part 112. As the ion exchange membrane 4, for example. Neosepta (registered trademark) of Astom Corporation, Selemion (registered trademark) or Aciplex (registered trademark) of Asahi Glass Corporation, Ltd., Fumasep (registered trademark) or fumapem (registered trademark) of Fumatech Corporation, Nation (registered trademark) of DuPont Corporation being a fluorocarbon resin made by performing sulfonation and polymerization on tetrafluoroethylene, lewabrane (registered trademark) of LANXESS Corporation, IONSEP (registered trademark) of IONTECH Corporation, Mustang (registered trademark) of PALL Corporation, ralex (registered trademark) of mega Corporation, Gore-Tex (registered trademark) of Gore-Tex Corporation, or the like can be used. Besides, the ion exchange membrane may be constituted of a membrane whose basic structure is hydrocarbon, or a membrane having an amine group in anion exchange. Note that the ion exchange membrane 4 does not necessarily have to be provided.

When the ion exchange membrane 4 is a proton exchange membrane, the hydrogen ions can migrate to the electrolytic solution 21 side. Use of an ion exchange membrane being a solid polymer membrane such as Nation can increase the migration efficiency of the ions. Note that the ion exchange membrane 4 does not necessarily have to be provided, but a salt bridge such as agar may be provided in place of the ion exchange membrane 4.

The porous body 6 is immersed in the electrolytic solution 21. The porous body 6 has pore portions. The pore size of the pore portion is preferably, for example, 1 µm or less. When it is 1 µm or less, the influence of the gas exchange velocity between a gas phase and a liquid phase can be reduced. Further, it is possible to suppress movement of electrolytic solution components into the porous body 6 due to surface tension, and efficiently separate the gas phase and the liquid phase.

The porous body 6 is formed using a porous body of a resin material such as polyolefin such as polyethylene (PE), polyethylene terephthalate (PET), polybutylene terephthalate (PBT), polypropylene (PP), polytetrafluoroethylene (PTFE) or the like. Further, a hollow fiber membrane in a laminated structure having a non-porous film and porous films provided to hold the non-porous film in between may be used. The porous film using polyolefin or the like is preferable because it has a high mechanical strength. As the non-porous body, for example, a resin having high gas permeability such as urethan is used. The above laminated structure can increase the mechanical strength, increase separation between the liquid phase and the gas phase, and accelerate dissolution of carbon oxide in the electrolytic solution due to an increase in contact area between the gas phase and the liquid phase.

The porous body 6 preferably has a hydrophobic property or water repellency with respect to the electrolytic solution. The porous body 6 having the hydrophobic property or water repellency can prevent the electrolytic solution from flowing back to the flow path 50 via the porous body 6. An example of the method of imparting the hydrophobic property or water repellency is a method of mixing a hydrophobic element such as fluorine into the above-described material, a method of subjecting water repellent treatment on the porous body of the above-described material or the like.

The flow path 50 extends to connect the outside of the electrolytic solution tank 11 and the porous body 6. The flow path 50 is, for example, a flow path for supplying, to the porous body 6, gas containing carbon dioxide supplied from a carbon dioxide supply unit 7 provided outside the electrochemical reaction device. The gas containing carbon dioxide is supplied to the electrolytic solution 21 via the porous body 6. A part of the flow path 50 may be embedded in the porous body 6. The shape of the flow path 50 is not particularly limited as long as it is a shape having a cavity allowing the gas containing carbon dioxide to flow, such as a tube.

Next, an operation example of the electrochemical reaction device illustrated in FIG. 1 will be described. When light enters the photoelectric conversion body 33, the photoelectric conversion body 33 generates photoexcited electrons and holes. In this event, the photoexcited electrons gather at the reduction electrode 31 and the holes gather at the oxidation electrode 32. This causes electromotive force in the photoelectric conversion body 33. The light is preferably sunlight, but light of a light-emitting diode or an organic EL may be made to enter the photoelectric conversion body 33.

A case of using electrolytic solutions containing water and carbon dioxide as the electrolytic solution 21 and the electrolytic solution 22 to produce carbon monoxide will be described. Around the catalyst layer 32, as expressed by the following formula (1), the oxidation reaction of water occurs to lose electrons and produce oxygen and hydrogen ions. At least one of the produced hydrogen ions migrates to the storage part 111 through the ion exchange membrane 4.

$$2H_2O \rightarrow 4H^+ + O_2 + 4e^- \quad (1)$$

Around the reduction electrode 31, as expressed by the following formula (2), the reduction reaction of carbon dioxide occurs in which hydrogen ions react with carbon dioxide while receiving electrons to produce carbon monoxide and water. Further, hydrogen ions receive electrons to produce hydrogen as expressed by the following formula (3). At this time, the hydrogen may be produced simultaneously with the carbon monoxide.

$$CO_2 + 2H^+ + 2e^- \rightarrow CO + H_2O \quad (2)$$

$$2H^+ + 2e^- \rightarrow H_2 \quad (3)$$

The photoelectric conversion body 33 needs to have an open-circuit voltage equal to or more than a potential difference between a standard oxidation-reduction potential of the oxidation reaction and a standard oxidation-reduction potential of the reduction reaction. For example, the standard oxidation-reduction potential of the oxidation reaction in Expression (1) and is 1.23 [V]. The standard oxidation-reduction potential of the reduction reaction in Expression (2) and is 0.03 [V]. The standard oxidation-reduction potential of the oxidation reaction in Expression (3) and is 0 [V]. At this time, the open-circuit voltage needs to be made 1.26 [V] or more in the reactions Expression (1) and Expression (2).

The open-circuit voltage of the photoelectric conversion body 33 is preferably set to be higher by a value of an overvoltage than the potential difference between the standard oxidation-reduction potential of the oxidation reaction and the standard oxidation-reduction potential of the reduction reaction. For example, the overvoltage in each of the oxidation reaction in Expression (1) and the reduction reaction in Expression (2) is 0.2 [V]. In the reactions in Expression (1) and Expression (2), the open-circuit voltage is preferably set to 1.66 [V] or more. Similarly, in the reactions in Expression (1) and Expression (3), the open-circuit voltage is preferably set to 1.63 [V] or more.

Of the raw materials relating to the reaction expressed in Expression (2), only carbon dioxide is gas and the other is liquid. Therefore, causing carbon dioxide to efficiently dissolve in liquid is important to increase the reaction efficiency. Increased dissolution velocity of carbon dioxide is advantageous to progress of the reaction.

The reduction reaction of hydrogen ions and carbon dioxide is the reaction consuming hydrogen ions. Accordingly, when the amount of hydrogen ions is small, the efficiency of the reduction reaction becomes worse. It is therefore preferable that the concentration of the hydrogen ions is made different between the electrolytic solution 21 and the electrolytic solution 22 to make it easy for the hydrogen ions to mitigate due to the concentration difference. The concentration of anions (for example, hydroxide ions or the like) may be made different between the electrolytic solution 21 and the electrolytic solution 22.

The reaction efficiency of Expression (2) varies depending on the concentration of carbon dioxide dissolved in the electrolyte solution. The reaction efficiency increases with an increase in carbon dioxide concentration, and decreases with a decrease in carbon dioxide concentration. The reaction efficiency of Expression (2) varies also depending on the hydrogen carbonate ion or carbonate ion concentration. However, the hydrogen carbonate ion concentration or the carbonate ion concentration can be adjusted by increasing the electrolytic solution concentration or adjusting the pH, and is thus adjusted more easily than the carbon dioxide concentration. Note that if an ion exchange membrane is provided between the oxidation electrode and the reduction electrode, complete prevention of decrease in performance is difficult because carbon dioxide gas, carbonate ions, hydrogen carbonate ions and the like pass through the ion exchange membrane 4.

The electrochemical reaction device in this embodiment includes a porous body immersed in the electrolytic solution containing carbon dioxide, and supplies gas containing carbon dioxide from the outside of the electrolytic solution tank via the porous body. The porous body increases the contact area between the gas containing carbon dioxide being the gas phase and the electrolytic solution being the liquid phase. This facilitates supply of the gas containing carbon dioxide to the electrolytic solution. Accordingly, the dissolution efficiency of the carbon dioxide to the electrolytic solution improves and the reduction efficiency can be increased. Further, imparting the hydrophobic property or water repellency to the porous body can increase separation between the gas phase and the liquid phase by the surface tension.

It is difficult to keep the gas containing carbon dioxide flowing and keep a pressurized state during stop of the reaction. Therefore, it is preferable to stop the supply of the gas containing carbon dioxide during stop of the reaction. In this event, when the porous body has no hydrophobic property or water repellency, carbon dioxide is dissolved in the electrolytic solution to reduce the pressure in the flow path for supplying the gas containing carbon dioxide. This causes the electrolytic solution to easily flow back into the flow path. If the electrolytic solution flows back, the electrolytic solution evaporates due to the gas containing carbon dioxide and the electrolytic solution components precipitate. When the electrolytic solution components precipitate, the pore portions of the porous body and the inside of the flow path become more likely to be clogged. In contrast to this, imparting the hydrophobic property or water repellency to the porous body can increase separation between the gas phase and the liquid phase by the surface tension to thereby suppress backflow. In the electrochemical reaction device with the above structure, the dissolution efficiency can be increased, the device can be downsized, and the electrolytic solution containing carbon dioxide with high concentration can be produced with a simple system, so that the whole efficiency improves.

Structural examples of the components in the electrochemical reaction device will be further described. As the electrolytic solution containing water applicable to the electrolytic solution, for example, an aqueous solution containing an arbitrary electrolyte can be used. This solution is preferably an aqueous solution accelerating an oxidization reaction of water. Examples of the aqueous solution containing an electrolyte include aqueous solutions containing phosphoric acid ions ($PO_4^{2-}$), boric acid ions ($BO_3^{3-}$), sodium ions ($Na^+$), potassium ions ($K^+$), calcium ions ($Ca^{2+}$), lithium ions ($Li^+$), cesium ions ($Cs^+$). magnesium ions ($Mg^{2+}$), chloride ions ($Cl^-$), hydrogen carbonate ions ($HCO^{3-}$) and so on.

Examples of the electrolytic solution containing carbon dioxide applicable to the electrolytic solution include aqueous solutions containing $LiHCO_3$, $NaHCO_3$, $KHCO_3$, $CsHCO_3$, phosphoric acid, boric acid and the like. The electrolytic solution containing carbon dioxide may contain alcohols such as methanol, ethanol, and acetone. The electrolytic solution containing water may be the same as the electrolytic solution containing carbon dioxide. However, preferably, the absorption amount of carbon dioxide in the electrolytic solution containing carbon dioxide is high. Accordingly, as the electrolytic solution containing carbon dioxide, a solution different from the electrolytic solution containing water may be used. The electrolytic solution containing carbon dioxide is preferably an electrolytic solution that decreases the reduction potential of carbon dioxide, has high ion conductivity, and contains a carbon dioxide absorbent that absorbs carbon dioxide.

As the above-described electrolytic solution, for example, an ionic liquid which is made of a salt of cations such as an imidazolium ion or a pyridinium ion and anions such as $BF_4^-$ or $PF_6^-$ and which is in a liquid state in a wide temperature range, or its aqueous solution can be used. Other examples of the electrolytic solution include amine solutions of ethanolamine, imidazole, and pyridine, or aqueous solutions thereof. Examples of amine include primary amine, secondary amine, and tertiary amine. These electrolytic solutions may have high ion conductivity, have a property of absorbing carbon dioxide, and have characteristics of decreasing the reduction energy.

Examples of the primary amine include methylamine, ethylamine, propylamine, butylamine, pentylamine, hexylamine, and the like. Hydrocarbons of the amine may be substituted by alcohol, halogen, or the like. Examples of the amine whose hydrocarbons are substituted include methanolamine, ethanolamine, chloromethyl amine, and so on. Further, an unsaturated bond may exist. These hydrocarbons are the same in the secondary amine and the tertiary amine.

Examples of the secondary amine include dimethylamine, diethylamine, dipropylamine, dibutylamine, dipentylamine, dihexylaniine, dimethanolamine, diethanolamine, dipropanolamine, and so on. The substituted hydrocarbons may be different. This also applies to the tertiary amine. Examples in which the hydrocarbons are different include methylethylamine, methylpropylamine, and so on.

Examples of the tertiary amine include trimethylamine, triethylamine, tripropylamine, tributylamine, trihexylamine, trimethanolamine, triethanolamine, tripropanolamine, tributanolamine, triexanolamine, methyldiethylamine, methyldipropylamine, and so on.

Examples of the cation of the ionic liquid include a 1-ethyl-3-methylimidazolium ion, a 1-methyl-3-propylimidazolium ion, a 1-butyl-3-methylimidazole ion, a 1-methyl-3-pentylimidazolium ion, a 1-hexyl-3-methylimidazolium ion, and so on.

Note that a second place of the imidazolium ion may be substituted. Examples of the cation having the imidazolium ion in which second place is substituted include a 1-ethyl-2,3-dimethylimidazolium ion, a 1-2-dimethyl-3-propylimidazolium ion, a 1-butyl-2,3-dimethylimidazolium ion, a 1,2-dimethyl-3-pentylimidazolium ion, a 1-hexyl-2,3-dimethylimidazolium ion, and so on.

Examples of the pyridinium ion include methylpyridinium, ethylpyridinium, propylpyridinium, butylpyridinium, pentylpyridinium, hexylpyridinium, and so on. In both of the imidazolium ion and the pyridinium ion, an alkyl group may be substituted, or an unsaturated bond may exist.

Examples of the anion include a fluoride ion, a chloride ion, a bromide ion, an iodide ion, $BF_4^-$, $PF_6^-$, $CF_3COO^-$, $CF_3SO_3^-$, $NO_3^-$, $SCN^-$, $(CF_3SO_2)_3C^-$, bis(trifluoromethoxysulfonyl)imide, bis(perfluoroethylsulfonyl)imide, and so on. A dipolar ion in which the cation and the anion of the ionic liquid are coupled by hydrocarbons may be used. Note that a buffer solution such as a potassium phosphate solution may be supplied to the storage parts 111, 112.

Figure 2:
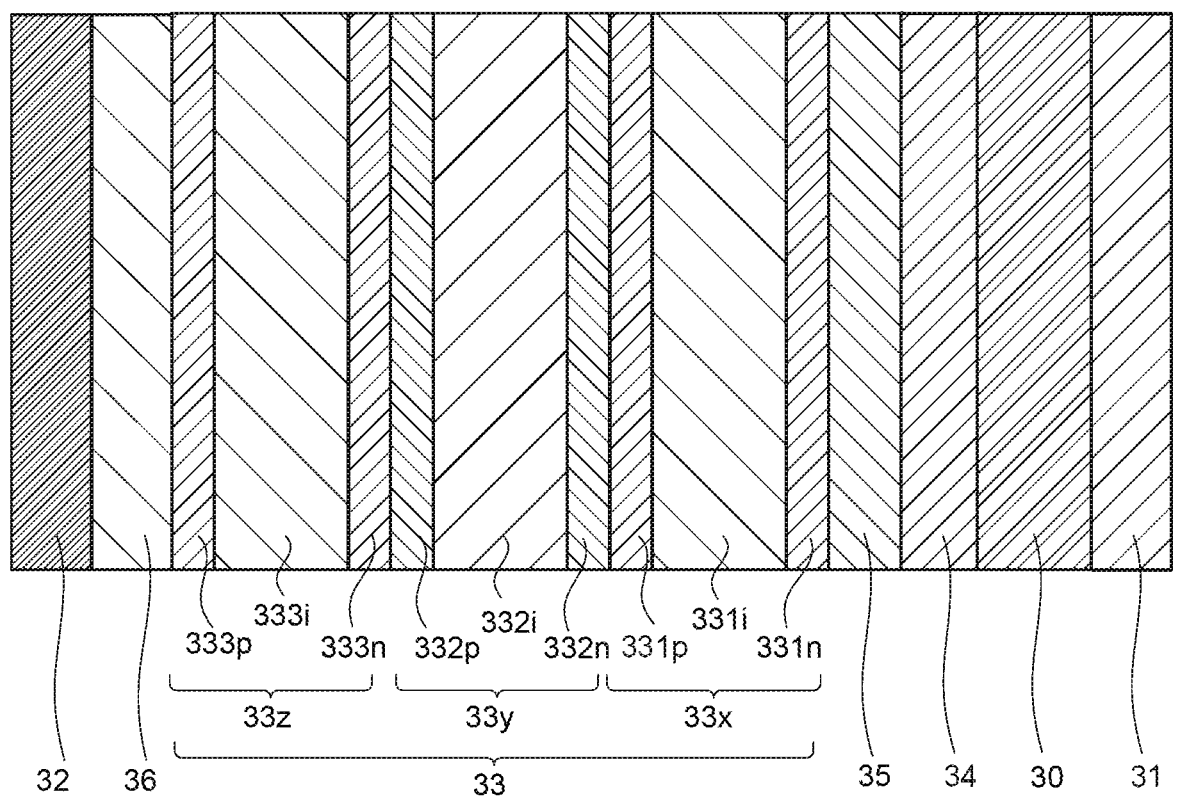
FIG. 2 is a schematic view illustrating a configuration example of a photoelectric conversion cell.
Figure 3:
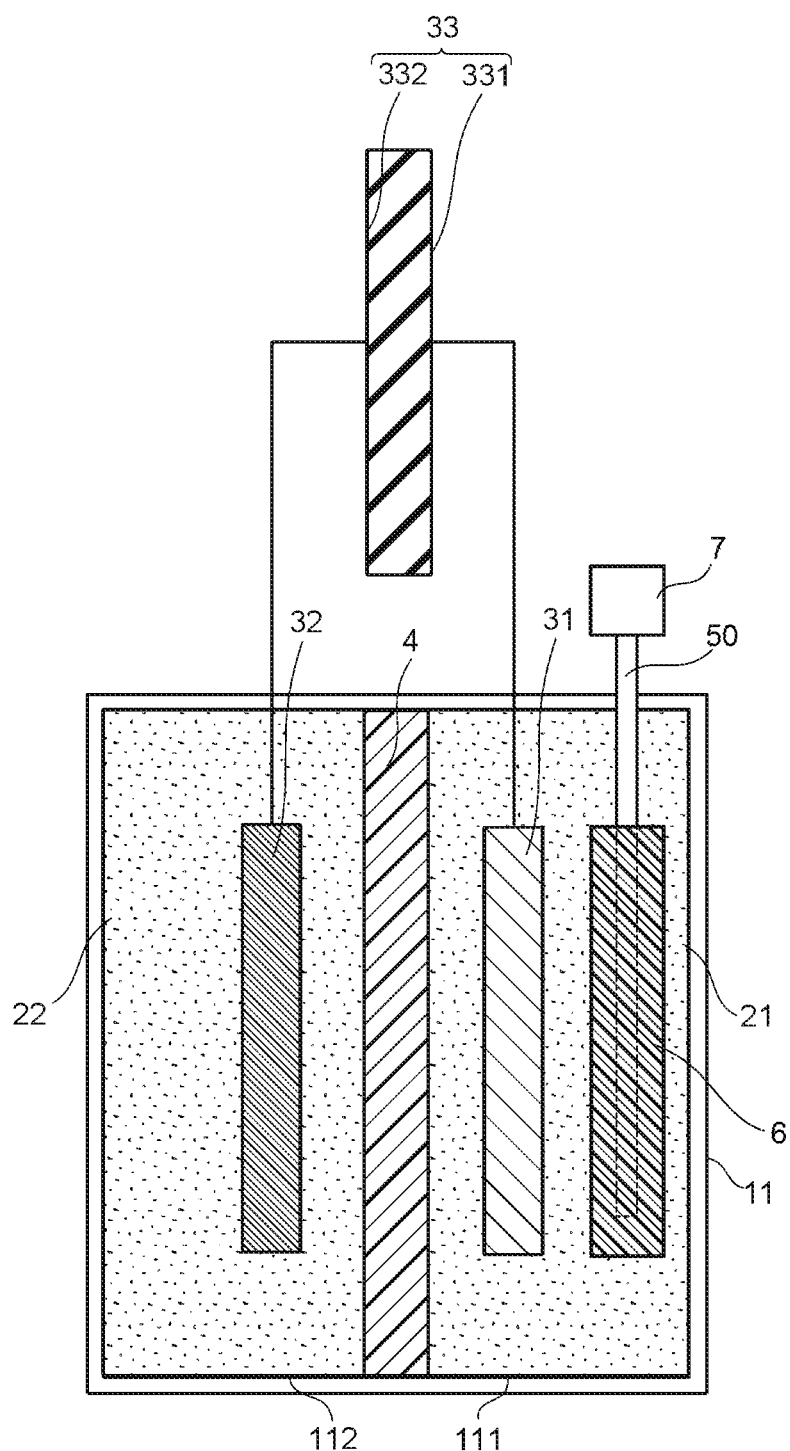
FIG. 3 is a schematic view illustrating another configuration example of the electrochemical reaction device.
Figure 4:
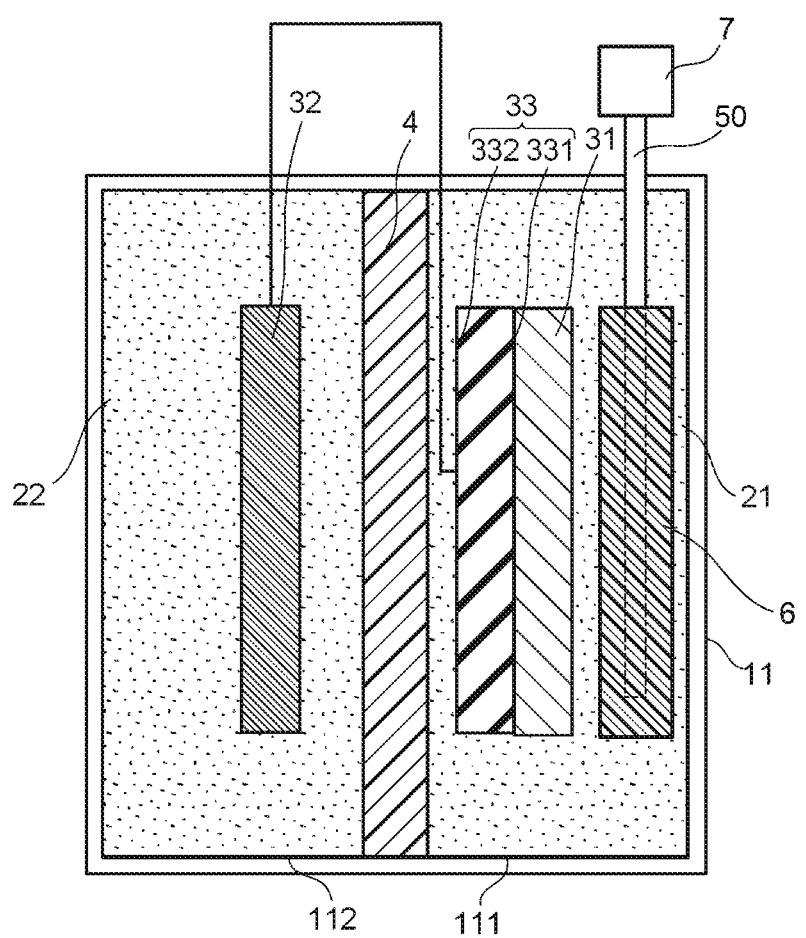
FIG. 4 is a schematic view illustrating another configuration example of the electrochemical reaction device.
Figure 5:
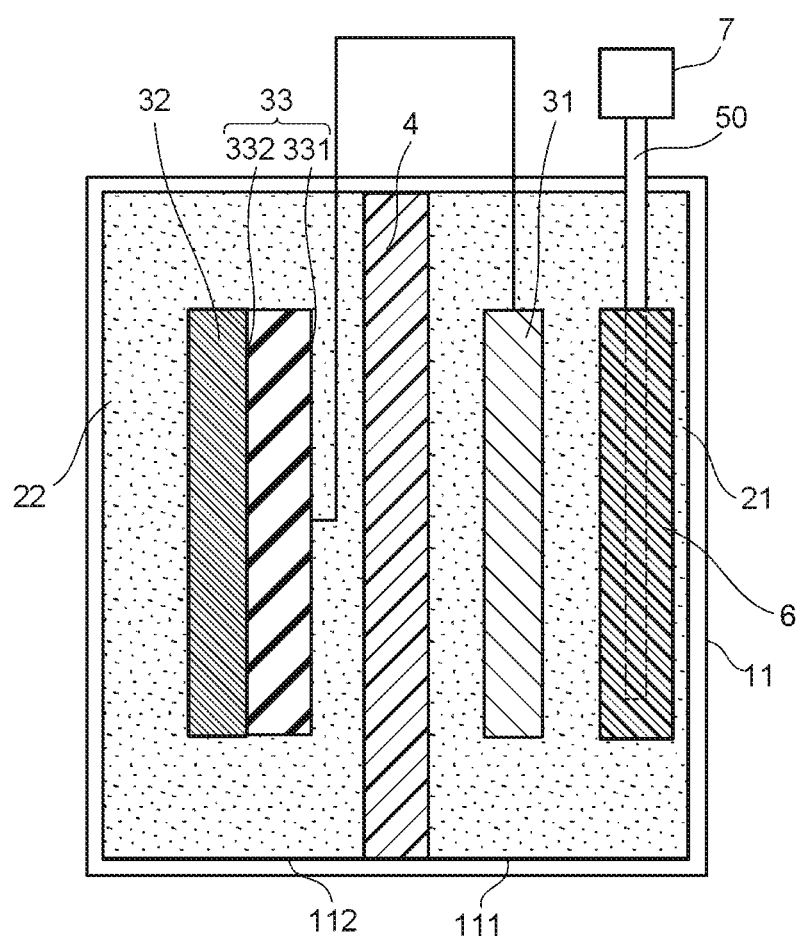
FIG. 5 is a schematic view illustrating another configuration example of the electrochemical reaction device.

FIG. 2 is a schematic sectional view illustrating a structural example of a photoelectric conversion cell. The photoelectric conversion cell illustrated in FIG. 2 includes a conductive substrate 30, the reduction electrode 31, the oxidation electrode 32, the photoelectric conversion body 33, a light reflector 34, a metal oxide body 35, and a metal oxide body 36.

The conductive substrate 30 is provided to be in contact with the reduction electrode 31. Note that the conductive substrate 30 may be regarded as a part of the reduction electrode. An example of the conductive substrate 30 is a substrate containing at least one or a plurality of Cu, Al, Ti, Ni, Fe, and Ag. For example, a stainless substrate including a stainless steel such as SUS may be used. The conductive substrate 30 is not limited thereto, and may be constituted using a conductive resin. Besides, the conductive substrate 30 may be constituted using a semiconductor substrate such as Si or Ge. Further, a resin film or the like may be used as the conductive substrate 30. For example, a membrane applicable to the ion exchange membrane 4 may be used as the conductive substrate 30.

The conductive substrate 30 has a function as a supporter. The conductive substrate 30 may be provided so as to separate the storage part 111 and the storage part 112. The provision of the conductive substrate 30 can improve the mechanical strength of the photoelectric conversion cell. Besides, the conductive substrate 30 may be regarded as a part of the reduction electrode 31. Further, the conductive substrate 30 does not necessarily have to be provided.

The reduction electrode 31 preferably contains a reduction catalyst. The reduction electrode 31 may contain both a conductive material and the reduction catalyst. Examples of the reduction catalyst include materials decreasing activation energy to reduce the hydrogen ions and carbon dioxide. In other words, the examples include materials which lower overvoltage when hydrogen and carbon compounds are generated by the reduction reaction of the hydrogen ions and carbon dioxide. For example, a metal material or a carbon material can be used. As the metal material, for example, a metal such as platinum nickel, or an alloy containing the metal can be used in the case of hydrogen. In the reduction reaction of carbon dioxide, a metal such as gold, aluminum, copper, silver, platinum, palladium, or nickel, or an alloy containing the metal can be used. As the carbon material, for example, graphene, carbon nanotube (CNT), fullerene, ketjen black, or the like can be used. Note that the reduction catalyst is not limited thereto, and, for example, a metal complex such as a Ru complex or a Re complex, or an organic molecule having an imidazole skeleton or a pyridine skeleton may be used as the reduction catalyst. Besides, a plurality of materials may be mixed.

The oxidation electrode 32 preferably contains an oxidation catalyst. The oxidation electrode 32 may contain both a conductive material and the reduction catalyst. Examples of the oxidation catalyst include materials decreasing activation energy to oxidize water. In other words, the examples include materials which lower overvoltage when oxygen and hydrogen ions are generated by the oxidation reaction of water. The examples include iridium, iron, platinum, cobalt, manganese, and the like. Besides, as the oxidation catalyst, a binary metal oxide, a ternary metal oxide, a quaternary metal oxide, or the like can be used. Examples of the binary metal oxide include manganese oxide (Mn—O), iridium oxide (Ir—O), nickel oxide (Ni—O), cobalt oxide (Co—O), iron oxide (Fe—O), tin oxide (Sn—O), indium oxide (In—O), ruthenium oxide (Ru—O), and so on. Examples of the ternary metal oxide include Ni—Co—O, La—Co—O, Ni—La—O, Ni—Fe—O, Sr—Fe—O, and so on. Examples of the quaternary metal oxide include Pb—Ru—Ir—O, La—Sr—Co—O, and so on. Note that the oxidation catalyst is not limited thereto, and a metal complex such as a Ru complex or a Fe complex can also be used as the oxidation catalyst. Besides, a plurality of materials may be mixed.

At least one of the reduction electrode 31 and the oxidation electrode 32 may have a porous structure. Examples of the material applicable to the electrode having the porous structure include a carbon black such as ketjen black and VULCAN XC-72, activated carbon, metal fine powder, and so on in addition to the above-described materials. The area of an activation surface which contributes to the oxidation-reduction reaction can be made large by having the porous structure, and therefore, the conversion efficiency can be increased.

The porous structure preferably has a fine pore distribution of 5 nm or more and 100 nm or less. With the fine pore distribution, the catalyst activity can be increased. Furthermore, the porous structure preferably has a plurality of fine pore distribution peaks. This can realize all of the increase in surface area, the improvement in dispersion of ions and reactant, and high conductivity at the same time. For example, the reduction electrode 31 may be constructed, for example, by stacking a reduction catalyst layer containing particles (particulate reduction catalyst) of a metal or an alloy applicable to the reduction catalyst of 100 nm or less on a conductive layer of the above-described material having a fine pore distribution of 5 µm or more and 10 µm or less. In this case, the particle may have the porous structure, but does not always need to have the porous structure from the conductive property or the relationship between the reaction site and the material diffusion. Besides, the particles may be supported by another material.

The reduction electrode 31 may have, a stacked structure of a porous conductive layer and a porous catalyst layer containing the reduction catalyst. For example, a mixture of Nafion, and conductive particles such as ketjen black or the like can be used as the porous conductive layer, and a gold catalyst can be used as the porous catalyst layer. Further, formation of projections and recesses of 5 µm or less on the surface of the porous catalyst layer can increase the reaction efficiency. Further, the surface of the porous catalyst layer is oxidized by application of a high frequency, and then subjected to electrochemical reduction, whereby the reduction electrode 31 having a nanoparticle structure can be formed. Other than gold, metal such as copper, palladium, silver, zinc, tin, bismuth, or lead is preferable. Besides, the porous conductive layer may further have a stacked structure in which layers have different pore sizes. The stacked structure having the different pore sizes makes it possible to adjust the difference in reaction due to the product concentration near the electrode or the difference in pH, by the pore sizes to improve the efficiency.

When an electrode reaction with low current density is performed by using relatively low light irradiation energy, there is a wide range of options in catalyst material. Accordingly, for example, it is easy to perform a reaction by using a ubiquitous metal or the like, and it is also relatively easy to obtain selectivity of the reaction. On, the other hand, when the photoelectric conversion body 33 is not provided in the electrolytic solution tank 11, but the photoelectric conversion body 33 is electrically connected to at least one of the reduction electrode 31 and the oxidation electrode 32 by a wire or the like, an electrode area generally becomes small for the reason of miniaturizing the electrolytic solution tank or the like, and the reaction is performed with high current density in some cases. In this case, it is preferable to use a noble metal as the catalyst.

The photoelectric conversion body 33 has a stacked structure including a photoelectric conversion layer 33$x$, a photoelectric conversion layer 33$y$, and a photoelectric conversion layer 33$z$. The number of stacked photoelectric conversion layers is not limited to that illustrated in FIG. 2.

The photoelectric conversion layer 33$x$ includes, for example, an n-type semiconductor layer 331$n$ containing n-type amorphous silicon, an i-type semiconductor layer 331$i$ containing intrinsic amorphous silicon germanium, and a p-type semiconductor layer 331$p$ containing p-type microcrystal silicon. The i-type semiconductor layer 331$i$ is a layer which absorbs light in a short wavelength region including, for example, 400 mm. Accordingly, charge separation occurs at the photoelectric conversion layer 33$x$ due to the light energy in the short wavelength region.

The photoelectric conversion layer 33y includes, for example, an n-type semiconductor layer 332n containing n-type amorphous silicon, an i-type semiconductor layer 332i containing intrinsic amorphous silicon germanium, and a p-type semiconductor layer 332p containing p-type microcrystal silicon. The i-type semiconductor layer 332i is, for example, a layer which absorbs light in an intermediate wavelength region including 600 nm. Accordingly, the charge separation occurs at the photoelectric conversion layer 33y due to the light energy in the intermediate wavelength region.

The photoelectric conversion layer 33z includes, for example, an n-type semiconductor layer 333n containing n-type amorphous silicon, an i-type semiconductor layer 333i containing intrinsic amorphous silicon, and a p-type semiconductor layer 333p containing p-type microcrystal silicon. The i-type semiconductor layer 333i is, for example, a layer which absorbs light in a long wavelength region including 700 nm. Accordingly, the charge separation occurs at the photoelectric conversion layer 33z due to the light energy in the long wavelength region.

The p-type semiconductor layer or the n-type semiconductor layer can be formed by, for example, adding an element to be donor or acceptor into the semiconductor material. Note that the semiconductor layer containing silicon, germanium, or the like is used as the semiconductor layer in the photoelectric conversion layer, but is not limited thereto, and for example, a compound semiconductor layer or the like can be used. As the compound semiconductor layer, for example, a semiconductor layer containing GaAs, GaInP, AlGaInP, CdTe, CuInGaSe, or the like can be used. Besides, a layer containing a material such as $TiO_2$ or $WO_3$ may be used as long as it can perform the photoelectric conversion. Further, each semiconductor layer may be single crystalline, polycrystalline, or amorphous. Besides, a zinc oxide layer may be provided in the photoelectric conversion layer.

The light reflector 34 is provided between the conductive substrate 30 and the photoelectric conversion body 33. An example of the light reflector 34 is a distribution Bragg reflector composed of, for example, a stack of metal layers or semiconductor layers. The provision of the light reflector 34 makes it possible to reflect the light which could not be absorbed by the photoelectric conversion body 33, and cause the light to enter any of the photoelectric, conversion layer 33x to the photoelectric conversion layer 33z, thereby increasing the conversion efficiency from light to chemical substances. As the light reflector 34, for example, a layer of a metal such as Ag, Au, Al, Cu, an alloy containing at least one of these metals, or the like can be used.

The metal oxide body 35 is provided between the light reflector 34 and the photoelectric conversion body 33. The metal oxide body 35 has a function of, for example, adjusting an optical distance to increase the light reflectivity. As the metal oxide body 35, it is preferable to use a material which can come into ohmic-contact with the n-type semiconductor layer 331n. As the metal oxide body 35, for example, a layer of light-transmissive metal oxide such as an indium tin oxide (ITO), zinc oxide (ZnO), fluorine-doped tin oxide (FTO), aluminum-doped zinc oxide (AZO), or antimony-doped tin oxide (ATO) can be used.

The metal oxide body 36 is provided between the oxidation electrode 32 and the photoelectric conversion body 33. The metal oxide body 36 may be provided at a surface of the photoelectric conversion body 33. The metal oxide body 36 has a function as a protective layer which suppresses breakage of the photoelectric conversion cell due to the oxidation reaction. The provision of the metal oxide body 36 makes it possible to suppress corrosion of the photoelectric conversion body 33, and elongate an operating life of the photoelectric conversion cell. Note that the metal oxide body 36 does not necessarily have to be provided.

As the metal oxide body 36, for example, a dielectric thin film such as $TiO_2$, $ZrO_2$, $Al_2O_3$, $SiO_2$, or $HfO_2$ can be used The thickness of the metal oxide body 36 is 10 nm or less, and 5 nm or less. This is to obtain the conductive property by the tunnel effect. As the metal oxide body 36, for example, a layer of a light transmissive metal oxide such as an indium tin oxide (ITO), zinc oxide (ZnO), fluorine-doped tin oxide (FTO), aluminum-doped zinc oxide (AZO), or antimony-doped tin oxide (ATO) may be used.

The metal oxide body 36 may have, for example, a structure where a metal and a transparent conductive oxide are stacked, a structure where a metal and another conductive material are complexed, or a structure where a transparent conductive oxide and another conductive material are complexed. The above structure makes it possible to reduce the number of parts and weight, make it easy to manufacture, and reduce the cost. The metal oxide body 36 may have functions as a protective layer, a conductive layer, and a catalyst layer.

In the photoelectric conversion cell illustrated in FIG. 2, a surface of the n-type semiconductor layer 331n opposite to a contact surface with the i-type semiconductor layer 331i is the first surface of the photoelectric conversion body 33, and a surface of the p-type semiconductor layer 333p opposite to a contact surface with the i-type semiconductor layer 333i is the second surface. As described above, by stacking the photoelectric conversion layer 33x to the photoelectric conversion layer 33z, the photoelectric conversion cell illustrated in FIG. 2 can absorb the light in a wide wavelength range of the sunlight and more effectively utilize the solar energy. At this time, respective photoelectric conversion layers are connected in series, and therefore high voltage can be obtained.

In FIG. 2, the electrodes are stacked on the photoelectric conversion body 33, and therefore the charge-separated electrons and holes can be utilized as they are for the oxidation-reduction reaction. Besides, it is unnecessary to electrically connect the photoelectric conversion body 33 and the electrodes by the wire or the like. It is therefore possible to perform the oxidation-reduction reaction with high efficiency.

A plurality of photoelectric conversion bodies may be electrically connected in parallel connection. A two-junction type, single-layer type photoelectric conversion body may be used. A stack of two or four or more photoelectric conversion bodies may be provided. A single photoelectric conversion layer may be used instead of the stack of the plurality of photoelectric conversion layers.

The electrochemical reaction device in this embodiment is a simplified system, in which the reduction electrode, the oxidation electrode, and the photoelectric conversion body are integrated to reduce the number of parts. Accordingly, for example, at least any one of manufacture, installation, and maintenance becomes easy. Further, the wires or the like connecting the photoelectric conversion body with the reduction electrode and the oxidation electrode become unnecessary, and therefore it is possible to increase the light transmittance, and enlarge the light receiving area.

There is a case where the photoelectric conversion body 33 is corroded because it is in contact with the electrolytic solution, and a corrosion product is dissolved in the electrolytic solution to cause deterioration of the electrolytic solution. To prevent the corrosion, provision of a protective layer can be considered. However, there is a case where a protective layer component is dissolved in the electrolytic solution. Hence, a filter such as a metal ion filter is provided in the flow path or the electrolytic solution tank to suppress the deterioration of the electrolytic solution.

The photo-electrochemical reaction device of the embodiment is a technology suitable for measures for excess power, and it is required to make use of the solar energy. When the illuminance of sunlight is strong, energy is obtained as much as possible in the case where there is no excess power and the energy is used for the electrolytic solution circulation or the like for consumption in the case where there is excess power. This effectively implements energy mix, and can increase an energy utilization ratio as a whole. In the case where a buffer solution is used for the electrolytic solution, when the reaction amount is small, a change in pH due to the reaction is also small. Hence, by circulating the electrolytic solution when the reaction is not performed to keep the electrolytic solution components uniform and by limiting or stopping the supply of the electrolytic solution in the reaction time, it is possible to suppress the decrease in total efficiency and cost. For example, the oxidation-reduction reaction is preferably performed by circulating the electrolytic solution using wind power at night or excess power at low cost, and stopping the electrolytic solution circulation or causing reaction at a minimum supply amount in daytime.

The structural example of the electrochemical reaction device is not limited to that in FIG. 1. FIG. 3 to FIG. 9 are schematic views illustrating other examples of the electrochemical reaction device. In the electrochemical reaction device illustrated in FIG. 3, the photoelectric conversion body 33 is provided on the outside of the electrolytic solution tank 11. In the electrochemical reaction device illustrated in FIG. 4, the photoelectric conversion body 33 is immersed in the electrolytic solution 21 on the storage part 111 side. In the electrochemical reaction device illustrated in FIG. 5, the photoelectric conversion body 33 is immersed in the electrolytic solution 22 on the storage part 112 side. Either the surface 331 and the reduction electrode 31 or the surface 332 and the oxidation electrode 32 are connected by a conductive member such as a wire or the like. The case of connecting the photoelectric conversion body and the reduction electrode or the oxidation electrode by the wire or the like, is advantageous in terms of a system because the components are separated for each function.

Figure 6:
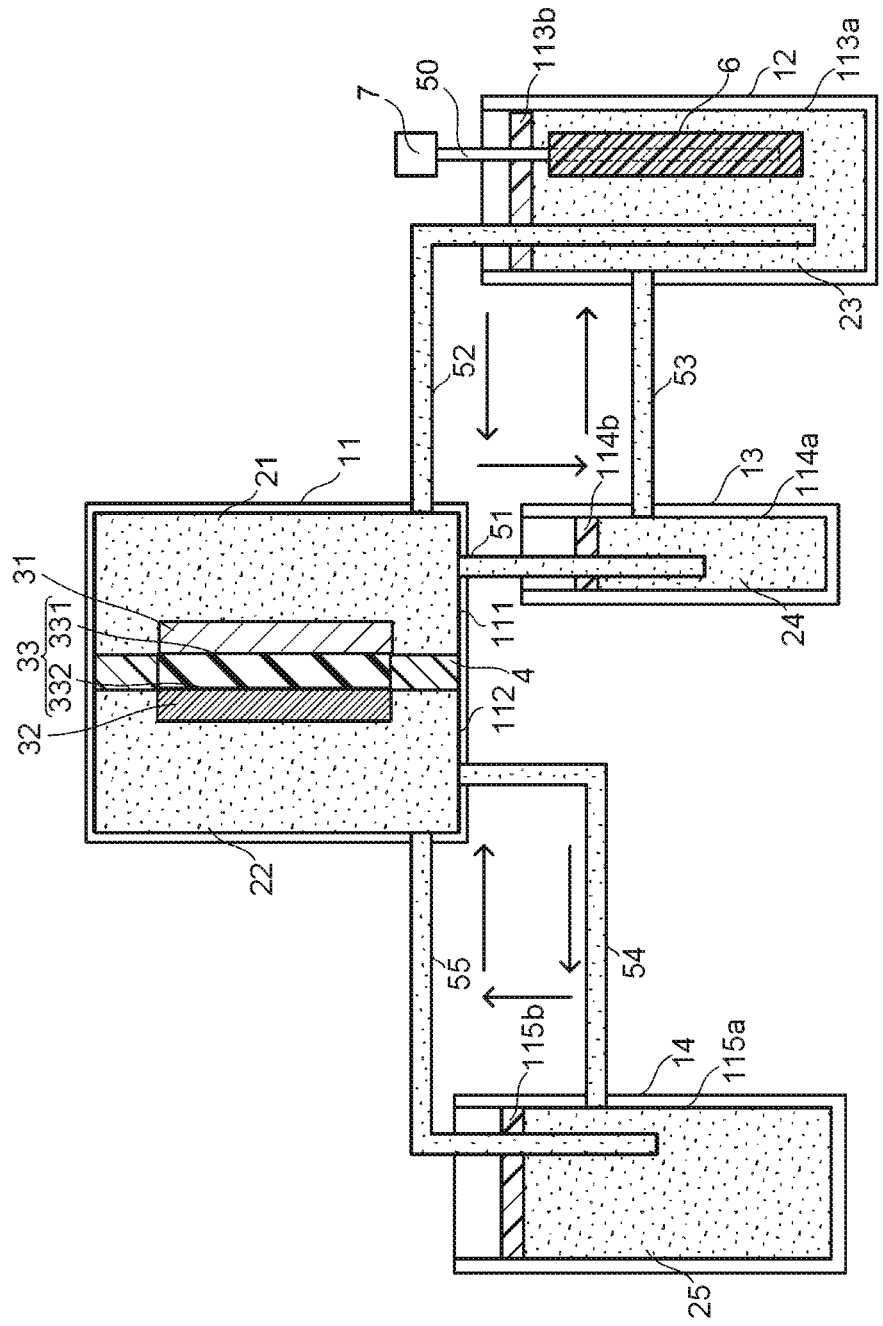
FIG. 6 is a schematic view illustrating another configuration example of the electrochemical reaction device.

The electrochemical reaction device illustrated in FIG. 6 further includes an electrolytic solution tank 12, a separation tank 13, an electrolytic solution tank 14, a flow path 51 to a flow path 56 in addition to the configuration illustrated in FIG. 1.

The electrolytic solution tank 12 includes a storage part 113a that stores an electrolytic solution 23, and a gas-liquid separation membrane 113b provided to separate the storage part 113a into a plurality of regions, for example, a region including liquid and a region including gas. In the electrochemical reaction device illustrated in FIG. 6, the porous body 6 is immersed in the electrolytic solution 23. Further, the flow path 50 extends to connect the outside of the electrolytic solution tank 12 and the porous body 6. The description of the flow path 50 illustrated in FIG. 1 can be appropriately quoted to the other description of the flow path 50.

The electrolytic solution 23 contains, for example, carbon dioxide with a higher concentration than that of the electrolytic solution 21. The electrolytic solution 23 may contain a material applicable to the electrolytic solution 21. The electrolytic solution tank 12 has a function as a carbon dioxide absorber. An example of a considerable method of increasing the concentration of carbon dioxide in the electrolytic solution 23 is a method of making the temperature of the electrolytic solution 23 lower than the temperature of the electrolytic solution 21. For example, a cooler may be provided which cools the inside of the storage part 113a. The shape of the electrolytic solution tank 12 is not limited in particular as long as it is a three-dimensional shape having a cavity being the storage part. As the electrolytic solution tank 12, for example, a material transmitting light may be used.

Another example of the considerable method of increasing the concentration of carbon dioxide in the electrolytic solution 23 is a method of making the pressure applied to the electrolytic solution 23 higher than the pressure applied to the electrolytic solution 21. For example, a pressure regulator may be provided which makes the pressure in the storage part 113 higher than the pressure in the storage part 111.

Supply of the electrolytic solution having the high carbon dioxide concentration adjusted in the electrolytic solution tank 12 to the electrolytic solution tank 11 can increase the carbon dioxide concentration in the electrolytic solution stored in the electrolytic solution tank 11. This can improve the efficiency of the reduction reaction.

The separation tank 13 has a storage part 114a that stores an electrolytic solution 24, and a gas-liquid separation membrane 114b provided to separate the storage part 114a into a plurality of regions, for example, a region including liquid and a region including gas. The shape of the separation tank 13 is not limited in particular as long as it is a three-dimensional shape having a cavity being the storage part. As the separation tank 13, for example, a material transmitting light is used.

The electrolytic solution tank 14 has a storage part 115a that stores an electrolytic solution 25, and a gas-liquid separation membrane 115b provided to separate the storage part 115a into a plurality of regions. The electrolytic solution 25 may contain a material applicable to the electrolytic solution 22. The shape of the separation tank 14 is not limited in particular as long as it is a three-dimensional shape having a cavity being the storage part. As the separation tank 14, for example, a material transmitting light may be used.

The shapes of the storage part 113a, storage part 114a, and storage part 115a are not limited in particular, and may have the same structure as that of the storage part 111 or the storage part 112. The gas-liquid separation membranes 113b, 114b, and 115b include, for example, a hollow fiber membrane and so on. The hollow fiber membrane includes, for example, a silicone resin or a fluorine-based resin (perfluoro alkoxy alkane (PFA), perfluoro ethylenepropene copolymer (FEP), polytetrafluoroethylene (PTFE), ethylene tetrafluoroethylene copolymer (ETFE), polyvinylidene fluoride (PVDF), polychlorotrifluoroethylene (PCTFE), ethylenechlorotrifluoroethylene copolymer (ECTFE)) or the like.

The flow path 51 to the flow path 56 have a function as an electrolytic solution flow path for circulating the electrolytic solution. The flow path 51 connects the storage part 111 and the storage part 114a. The flow path 52 connects the storage part 111 and the storage part 113a. The flow path 53 connects the storage part 113a and the storage part 114a. The ions and other substances contained in the electrolytic solution 21 can move to the separation tank 13 via the flow path 51. The ions and other substances contained in the electrolytic solution 23 can move to the storage part 111 via the flow path 52. Not limited to the above, the electrolytic solution and the product by the oxidation-reduction reaction may be circulated through the flow path 51 and the flow path 52.

The flow path 54 connects the storage part 112 and the storage part 115a. The flow path 55 connects the storage part 12 and the storage part 115a. At least a part of the electrolytic solution 22 is supplied to the storage part 115a via the flow path 54. The ions and other substances contained in the electrolytic solution 22 can move to the electrolytic solution tank 14 via the flow path 54. The ions and other substances contained in the electrolytic solution 25 can move to the storage part 112 via the flow path 55.

The shapes of the flow path 51 to the flow path 55 are not particularly limited as long as they each have a cavity allowing the electrolytic solution to flow, such as a pipe. The electrolytic solution in at least one flow path of the flow path 51 to the flow path 55 may be circulated by a circulating pump.

In the electrochemical reaction device illustrated in FIG. 6, a partial product of the reduction product in the electrolytic solution tank 11 is extracted in the separation tank 13. Reduction of the pressure on the outside of the gas-liquid separation membrane 114b (the opposite side to the contact surface with the electrolytic solution 24) and passage of the electrolytic solution 24 containing a gaseous product through the gas-liquid separation membrane 114b makes it possible to efficiently separate the gaseous product and carbon dioxide. In the case where the product is, for example, carbon monoxide, only carbon monoxide gas can be separated by gas-liquid separation in the separation tank 13.

In the case of dissolving carbon dioxide in the electrolytic solution 21, excessive undissolved carbon dioxide floats as gas. This gas is separated in the separation tank 13 and an electrolytic solution to be obtained is supplied to the storage part 111, whereby the concentration of the reduction product can be increased.

In the electrochemical reaction device illustrated in FIG. 6, a partial product of the reduction product in the electrolytic solution tank 11 is extracted in the separation tank 12. Reduction of the pressure on the outside of the gas-liquid separation membrane 113b (the opposite side to the contact surface with the electrolytic solution 23) and passage of the electrolytic solution 23 containing a gaseous product through the gas-liquid separation membrane 113b snakes it possible to efficiently separate the gaseous product and carbon dioxide. In the case where the product is, for example, carbon monoxide, only carbon monoxide gas can be separated by gas-liquid separation in the separation tank 12.

In the electrochemical reaction device illustrated in FIG. 6, reduction of the pressure on the outside of the gas-liquid separation membrane 115b (the opposite side to the contact surface with the electrolytic solution 25) and passage of the electrolytic solution containing a gaseous product through the gas-liquid separation membrane 115b makes it possible, to efficiently separate an oxygen gas and dissolved oxygen like carbon dioxide. It is conceivable to directly recover and use an oxygen gas produced in the electrolytic solution tank 11, but it is difficult to completely recover the oxygen gas because the oxygen gas dissolves in the electrolytic solution 22. This leads to a decrease in performance of the oxidation electrode, and therefore the dissolved oxygen is preferably recovered in a gaseous state. Unlike the gas separation in the electrolytic solution tank 11, it is possible to recover gas produced in a plurality of cells at a time. This can shorten the total flow path length for gas recover to simplify the system. In this case, for efficient recovery of the oxygen gas, temperature regulators can be provided in the electrolytic solution tank 14, the flow path 54, and the flow path 55 as in the electrolytic solution tank 12, leading to efficient separation of oxygen from the electrolytic solution.

Use of the gas-liquid separation membrane makes it possible to obtain oxygen from the electrolytic solution and remove carbon dioxide moving from the electrolytic solution on the reduction side to the electrolytic solution on the oxidation side. Removal of carbon dioxide from the electrolytic solution on the oxidation side enables use of an arbitrary electrolytic solution to widen the selectivity of the oxidation catalyst. The oxidation catalyst differs in activity depending on the electrolytic solution component, and therefore can be prevented from being deteriorated in characteristics.

Use of cobalt as the oxidation catalyst for water is an effective method because it affects the lifetime in the electrolytic solution and characteristics. Besides, the movement of carbon dioxide to the electrolytic solution 22 changes the pH of the electrolytic solution. A shift of the value of the pH by 1 causes oxidation of 56 mV and an electromotive force at the electrode on the reduction side.

The electromotive force can be used when performing an electrolytic reaction. Because the pH changes with the reaction, the potential caused by the difference in pH cannot be continuously obtained. However, it is possible to continue the reaction with the pH being maintained by continuously blowing carbon dioxide into the electrolytic solution on the reduction side or circulating an electrolytic solution with a high pH to the electrolytic solution on the oxidation side. Further, it is possible to continue the reaction utilizing the potential due to the difference in pH without feeding energy from the outside also by using and circulating a solution with a high pH existing in nature on the oxidation side and an electrolytic solution with a low pH on the reduction side. In this event, the potential obtained due to the difference in pH caused from the movement of carbon dioxide lowers, and therefore the removal of carbon dioxide from the electrolytic solution on the oxidation side contributes to efficiently causing the reaction.

The provision of the temperature regulator in the separation tank 13 or the flow path 51 can increase the separation efficiency of the product. For complete gas separation, it is preferable to remove the dissolved gas in the electrolytic solution as much as possible. To increase the efficiency of removing the dissolved gas by temperature distribution or the like, the separation tank 13 is preferably provided with a stirring means.

The difference between the temperature of the electrolytic solution 24 in the separation tank 13 and the temperature of the electrolytic solution 21 in the electrolytic solution tank 11 may be 10° C. or more and 10° C. or less. When the temperature of the electrolytic solution 24 in the separation tank 13 is too high, the dissolved carbon dioxide evaporates and the gas concentration of the product is apt to decrease. Since the energy loss due to heating is large, excessive heating causes a decrease in efficiency.

In the case where the product is a water-soluble liquid substance such as methanol or ethanol, the separation method of the separation tank 13 may be, for example, distillation or membrane separation. In this case, the temperature regulator is preferably provided for improvement of the separation efficiency. The separation membrane may be, for example, zeolite. In particular, the heat is large at the upstream, and therefore the whole efficiency is apt to decrease. Thus, a heat insulating material is provided in the separation tank 13, whereby the decrease in the efficiency can be prevented.

In the case of directly blowing carbon dioxide into the electrolytic solution tank 11, if the reduction product is gaseous carbon monoxide or the like, it is necessary to separate a carbon dioxide gas and a carbon monoxide gas. This may cause an increase in cost due to complication of the device and an energy loss because energy is required for the separation.

The electrochemical reaction device in this embodiment includes a porous body immersed in an electrolytic solution containing carbon dioxide in a second electrolytic solution tank, and supplies gas containing carbon dioxide via the porous body from the outside of the second electrolytic solution tank. The porous body increases the contact area between the gas containing carbon dioxide being the gas phase and the electrolytic solution being the liquid phase. This facilitates supply of the gas containing carbon dioxide to the electrolytic solution. Therefore, the efficiency of dissolving carbon dioxide with respect to the electrolytic solution can improve to increase the reduction efficiency. Further, imparting to the porous body the hydrophobic property or water repellency can increase the separation between the gas phase and the liquid phase due to surface tension.

In the case of cooling the storage part 111, the reaction efficiency is apt to decrease because the reaction by the catalyst decreases. Besides, in the case of pressurizing the storage part 111, the cost increases and the structure becomes complicated because of the need to increase the pressure resistance of the electrolytic solution tank 11. Further, the increase in the pressure resistance deteriorates the maintainability such as complication of exchange of electrodes.

To reduce the supply amount of carbon dioxide or to causes the electrolytic solution to efficiently absorb carbon dioxide, the interval between bubbles of carbon dioxide passing through the electrolytic solution needs to be large. However, increasing the concentration of carbon dioxide decreases the interval between bubbles, so that the electrolytic solution tank can be made smaller. The cooling temperature is preferably, for example, equal to or lower than the temperature of the electrolytic solution in the first electrolytic solution tank. When the temperature of the electrolytic solution increases by the oxidation-reduction reaction, the cooling temperature is preferably equal to or higher than room temperature and equal to or lower than the temperature of the electrolytic solution in the first electrolytic solution tank. The cooling temperature is more preferably equal to or higher than the temperature at which the electrolytic solution does not freeze and equal to or lower than the electrolytic solution temperature.

In the case where an ion exchange membrane and a flow path are provided between the oxidation electrode and the reduction electrode in the electrolytic solution tank, the electrolytic solution in contact with the oxidation electrode may be different from the electrolytic solution in contact with the reduction electrode. With the above configuration, oxygen being the reaction product on the oxidation side can be easily separated and taken out.

There is an electrolytic solution suitable for each catalyst, and by changing the electrolytic solution in contact with each catalyst layer, the efficiency can be improved. Furthermore, there is an advantage, in the case where the pH is made larger on the oxidation side as compared between the oxidation side and the reduction side, that the potential of insufficient reaction can be supplemented with the liquid junction potential resulting from a difference in pH.

The temperature of the electrolytic solution 21 in the electrolytic solution tank 11 is preferably higher than the freezing temperature. For example, in the case where the electrolytic solution contains ions such as potassium ion or sodium ion in order to improve the amount of absorbing carbon dioxide, to improve the carbon dioxide concentration and the $HCO_3$ ion concentration, and to improve the solution resistance of the electrolytic solution, the electrolytic solution does not freeze at 0° C. However, to excessively cool the electrolytic solution, a large-size freezer is required, leading to cost and energy loss, and therefore there is a case where the temperature is preferably 0° C. or higher. Besides, there may be an energy loss in the whole electrochemical reaction device and a reaction decrease due to excessive cooling of the electrolytic solution, and therefore the temperature may be preferably 5° C. or higher and 10° C. or higher.

The temperature regulators may be provided in the electrolytic solution tanks 11, 12 and the flow path 51 to the flow path 55 in order to suppress a decrease in reaction efficiency due to a decrease in the electrolytic solution temperature. Regulation of temperature by the temperature regulators improves the reaction efficiency. For example, a cooler may be provided in the flow path 51, and a heater may be provided in the flow path 52. Since the effect can be obtained even by a temperature difference of several degrees Celsius, warming by sunlight irradiation of the electrolytic solution flow path between the first electrolytic solution tank and the second electrolytic solution tank and the electrolytic solution tanks is efficient because natural energy can be used. Further, in the case of performing a later-described main reaction by converting the sunlight into electric energy, the efficiency further improves because the heat energy and light energy of the sunlight can be efficiently used.

Figure 7:
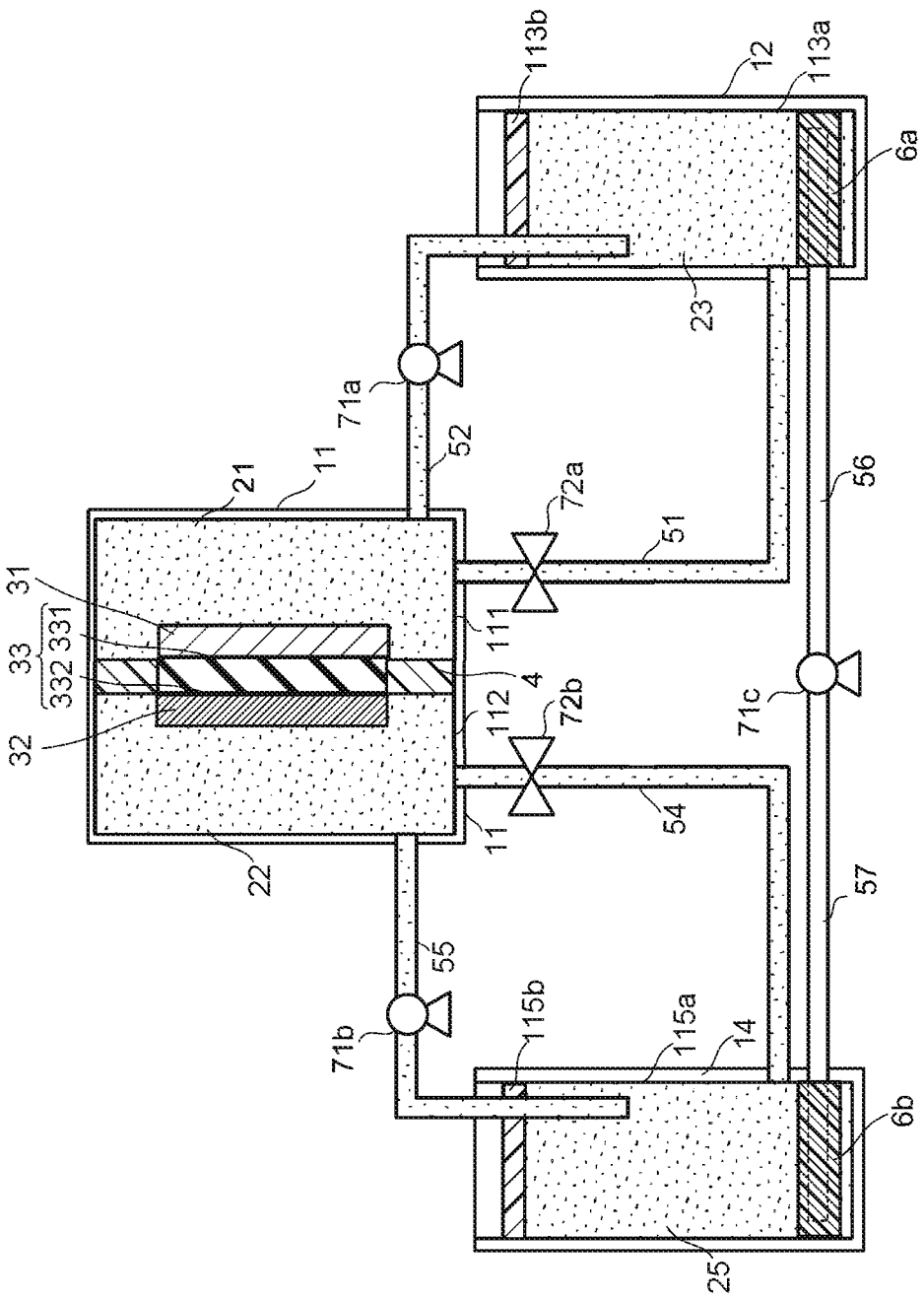
FIG. 7 is a schematic view illustrating another configuration example of the electrochemical reaction device.

An electrochemical reaction device illustrated in FIG. 7 has a configuration which does not have the separation tank 13 and the flow path 53 in the electrochemical reaction device illustrated in FIG. 6, and further includes a porous body 6a, a porous body 6b, a flow path 56, a flow path 57, pumps 71a to 71c, a pressure valve 72a, and a pressure valve 72b. The flow path 51 connects the storage part 111 and the storage part 113a.

The porous body 6a is immersed in the electrolytic solution 23. The porous body 6b is immersed in the electrolytic solution 25. The description of the porous body 6 can be appropriately quoted to the other description of the porous body 6a and the porous body 6b. The flow path 56 connects the porous body 6a and the pump 71c. The flow path 56 extends from the outside of the electrolytic solution tank 12 to connect to the porous body 6a. The flow path 56 is a flow path for supplying gas containing carbon dioxide to the porous body 6a. The flow path 57 connects the porous body 6b and the pump 71c. The flow path 57 extends from the outside of the electrolytic solution tank 14 to connect to the porous body 6b. The flow path 57 is a flow path for recovering gas containing oxygen from the electrolytic solution 25 via the porous body 6b. For the shapes or materials of the flow path 56 and the flow path 57, the shapes or materials applicable to the flow paths 51 to 55 are used.

The pump 71a has a function of promoting supply of the electrolytic solution from the storage part 113a to the storage part 111. The pump 71a is provided, for example, inside or outside the flow path 52. The pump 71a does not necessarily have to be provided.

The pump 71*b* has a function of promoting supply of the electrolytic solution from the storage part 115*a* to the storage part 112. The pump 71*b* is provided, for example, inside or outside the flow path 55. The pump 71*b* does not necessarily have to be provided.

The pump 71*c* has a function of promoting supply of the gas containing carbon dioxide to the storage part 113*a*. The pump 71*c* is provided, for example, inside or outside the flow path 56. In this case, a pressure regulator which increases the pressure in the storage part 113*a* or the flow path 56 is preferably provided. Further, a pressure regulator which increases the pressure in the storage part 113*a* or the flow path 56 and reduces the pressure in the flow path 57 may be provided. The pressure regulator may be composed of, for example, a pressurizer and a pressure reducer.

The pressure valve 72*a* has a function of promoting supply of the electrolytic solution from the storage part 111 to the storage part 113 The pressure valve 72*a* is provided, for example, inside or outside the flow path 51. The pressure valve 72*b* has a function of promoting supply of the electrolytic solution from the storage part 112 to the storage part 115*a* The pressure valve 72*b* is provided, for example, inside or outside the flow path 54. Examples of the pressure valve 72*a* and the pressure valve 72*b* include an orifice valve, a pulse valve and so on. Note that the pressure valve 72*a* and the pressure valve 72*b* do not necessarily have to be provided.

In the electrochemical reaction device illustrated in FIG. 7, supply of the gas containing carbon dioxide pressurized using the pump 71*c* to the storage part 113*a* makes it possible to increase the efficiency of dissolving carbon dioxide. It is also possible to suppress a decrease in circulation amount of carbon dioxide due to pressure loss when passing through the porous body 6*a*.

Further, use of the pressure-reducing mechanism of the pump 71*c* makes it possible to take out oxygen and carbon dioxide contained in the electrolytic solution via the porous body 6*b*. Further, physical motive power of a motor or the like used in the pressure pump is used for the pressure-reducing pump to make the power source common, whereby the friction in drive or the like is reduced and devices to be controlled can be reduced, resulting in effect in reduction in efficiency and cost. Further, the efficiency of separating carbon dioxide to be supplied and oxygen to be recovered can be increased.

Figure 8:
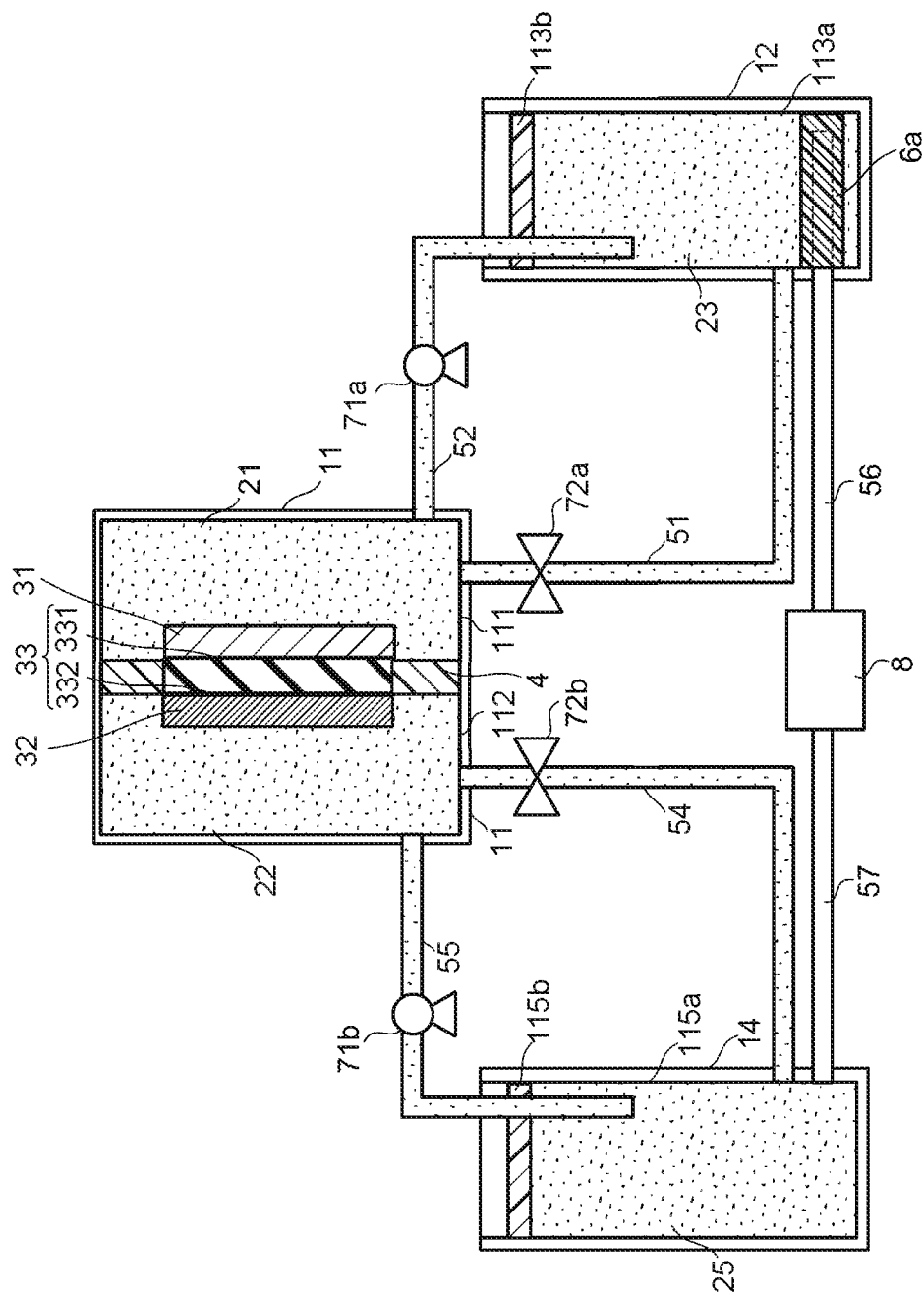
FIG. 8 is a schematic view illustrating another configuration example of the electrochemical reaction device.

An electrochemical reaction device illustrated in FIG. 8 has a configuration which does not have the porous body 6*b* and the pump 71*c* in the configuration illustrated in FIG. 7. In the electrochemical reaction device illustrated in FIG. 8, oxygen obtained in the electrolytic solution tank 14 is supplied to a carbon dioxide generation source 8. In the carbon dioxide generation source 8, carbon dioxide is generated using the supplied oxygen and supplied to the electrolytic solution tank 12. The oxygen recovered as describe above is supplied to the carbon dioxide generation source, thereby making it possible to improve the efficiency of the carbon dioxide generation source 8 and improve the efficiency of the whole.

Figure 9:
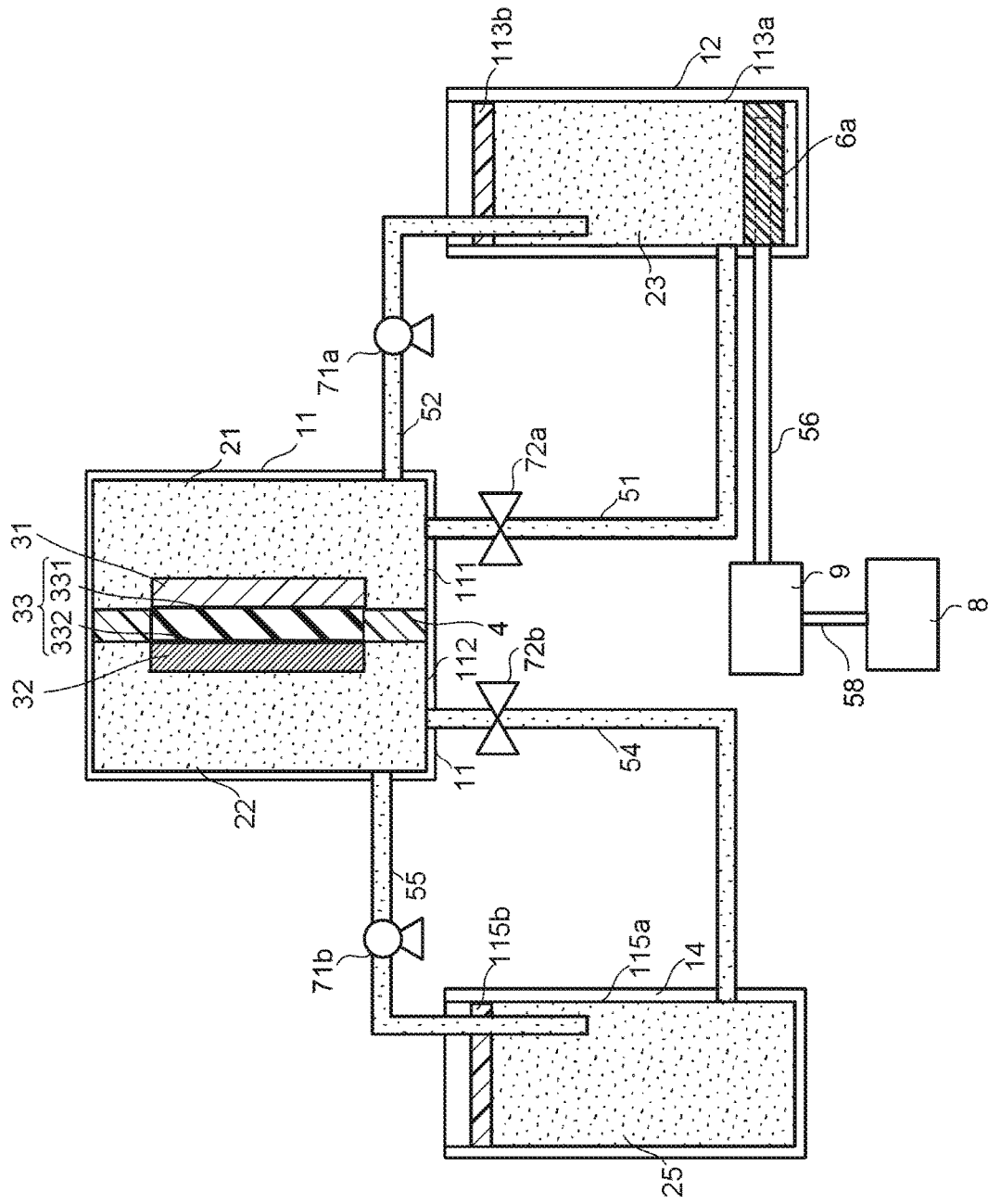
FIG. 9 is a schematic view illustrating another configuration example of the electrochemical reaction device.

An electrochemical reaction device illustrated in FIG. 9 has a configuration which does not have the flow path 57 and the pump 71*c* illustrated in FIG. 8. The flow path 56 connects a carbon capture storage device 9 and the storage part 113*a*. The carbon capture storage device 9 is connected to the carbon dioxide generation source 8 via the flow path 58.

The carbon capture storage device 9 is provided from the viewpoint of a reduction in exhaust amount of carbon dioxide. In the carbon capture storage device 9, for example, the exhausted carbon dioxide is absorbed into an amine solution or zeolite. Re-emission of the absorbed carbon dioxide by heat or the like can increase the concentration and purity of carbon dioxide. Thus obtained carbon dioxide is, for example, buried in the earth or used for extraction of a natural gas or a shale gas, whereby an increase in carbon dioxide concentration in the air can be suppressed. Supply of the carbon dioxide with high concentration obtained by the carbon capture storage device to the porous body 6*a* can increase the efficiency of dissolving carbon dioxide. The use of the carbon capture storage device 9 as described above can reduce the exhaust amount of carbon dioxide, improve the whole system efficiency through use of oxygen, and realize a system capable of obtaining valuable resources.

EXAMPLE

Example 1

An electrochemical reaction device including a structure was fabricated. The structure includes a three junction type photoelectric conversion body with a thickness of 500 nm, a ZnO layer with a thickness of 300 nm provided on a first surface of the three-junction type photoelectric conversion body, an Ag layer with a thickness of 200 nm provided on the ZnO layer, a SUS substrate with a thickness of 1.5 mm provided on the Ag layer, and an ITO layer with a thickness of 100 nm provided on a second surface of the three-junction type photoelectric conversion body. Note that each layer on the SUS substrate has a texture structure of a submicron order for obtaining the light confinement effect.

The three-junction type photoelectric conversion body includes a first photoelectric conversion layer which absorbs light in the short wavelength region, a second photoelectric conversion layer which absorbs light in the intermediate wavelength region, and a third photoelectric conversion layer which absorbs light in the long wavelength region. The first photoelectric conversion layer includes a p-type microcrystalline silicon layer, an i-type amorphous silicon layer, and an n-type amorphous silicon layer. The second photoelectric conversion layer includes a p-type microcrystalline silicon layer, an i-type amorphous silicon germanium layer, and an n-type amorphous silicon layer. The third photoelectric conversion layer includes a p-type microcrystalline silicon germanium layer, an i-type amorphous silicon layer, and an n-type amorphous silicon layer.

Next, a Ni catalyst layer with a thickness of 5 nm was formed as an oxidation catalyst on the ITO layer by an atomic layer deposition method. Further, a conducting wire was connected to the rear surface of the SUS substrate. A composite substrate (4 cm square) having a SUS substrate with a thickness of 1.5 mm and a gold-bearing carbon film with a bearing amount of 0.25 mg/cm$^2$ on the SUS substrate which were connected through the conducting wire was prepared. An ion exchange membrane (Nafion 117, 6 cm square) was provided between the composite substrate and the structure, and a potassium carbonate solution was supplied into the module. The composite substrate was used as a reduction electrode, the oxidation catalyst side of the structure was used as an oxygen electrode, and a silver-silver chloride electrode was used as a reference electrode. A galvanostat was used to pass current under a condition of 2.3 mA/cm$^2$ to reduce carbon dioxide to thereby produce carbon monoxide. In this event, carbon dioxide was supplied via a porous body made by bundling, tubular porous bodies each having a urethane resin sandwiched in between polyethylene with a pore size of 0.5 µm or less.

A production efficiency η that is the production efficiency of carbon monoxide measured when the structure was irradiated with light using a solar simulator (AM1.5, 1000 W/m²) is obtained by the following expression.

$$\eta\ (\%) = \frac{R(CO) \times \Delta G^0}{P \times S} \quad \text{[Math 1]}$$

In the formula, R(CO) is a production rate (mol/s) of carbon monoxide. ΔG⁰ is standard Gibbs energy of combustion of carbon monoxide. The Gibbs energy was set to 257.2 kJ/mol at 298K. P is irradiation energy of sunlight. The irradiation energy was set to 0.1 J/s·cm² is a light receiving area of sunlight. The result is listed in Table 1.

Recovery of gas was performed above the reduction electrode to sample evaporated gas and identify and determine the quantity of the gas by gas chromatography. The result is listed in Table 1.

Comparative Example 1

A module was produced by the same method as that in Example 1 except that carbon dioxide was supplied to the electrolytic solution tank via a glass frit with a pore size of about 10 µm, and subjected to measurement. The result is listed in Table 1.

Example 2

A urethane resin of 0.1 µm was sandwiched in between a polyethylene porous film with a pore size of 0.5 µm or less into a tubular shape in the electrolytic solution on the oxidation electrode side. The pressure in the tubular porous film was reduced, and reaction and measurement were carried out by the same means as that in Example 1. The result is listed in Table 1.

It is found, from the results of Examples 1, 2 and Comparative example 1, that the provision of the porous body and the supply of the gas containing carbon dioxide to the electrolytic solution via the porous body increases the efficiency of dissolving carbon dioxide and increases the efficiency of producing carbon monoxide. It is also found that the provision of the porous body in the electrolytic solution tank connected to the storage part on the oxygen side and the recovery of the gas containing oxygen can further increase the efficiency of producing carbon monoxide.

TABLE 1

| | Production efficiency [%] | CO content ratio of recovered gas [%] | Production efficiency after 3 hours [%] |
|---|---|---|---|
| Example 1 | 3 | 95 | 2.6 |
| Comparative example 1 | 2 | 5 | — |
| Example 2 | 3 | 95 | 3.8 |

The above embodiments have been presented by way of example only, and are not intended to limit the scope of the inventions. The above embodiments may be embodied in a variety of other forms, and various omissions, substitutions and changes may be made without departing from the spirit of the inventions. The above embodiments and modifications thereof are included in the scope and spirit of the inventions and included in the inventions described in the claims and their equivalents.

What is claimed is:

1. An electrochemical reaction device, comprising:
    a first tank including a first storage part to store a first electrolytic solution containing carbon dioxide, and a second storage part to store a second electrolytic solution containing water;
    a reduction electrode disposed in the first storage part;
    an oxidation electrode disposed in the second storage part;
    a second tank including a third storage part to store a third electrolytic solution containing carbon dioxide higher in concentration than carbon dioxide of the first electrolytic solution;
    a first flow path connecting the first storage part and the third storage part;
    a first porous body disposed in the third storage part;
    a second flow path connected to the first porous body;
    a third tank including a fourth storage part to store a fourth electrolytic solution containing water;
    a third flow path connecting the second storage part and the fourth storage part;
    a second porous body disposed in the fourth storage part;
    a fourth flow path connected to the second porous body; and
    a pump to depressurize an inside of the fourth flow path and thus extract carbon dioxide from the fourth electrolytic solution through the second porous body and the fourth flow path, and to pressurize an inside of the second flow path and thus supply the carbon dioxide from the fourth flow path to the first porous body through the second flow path.

2. The device of claim 1,
    wherein the first porous body has a hydrophobic property or a water repellency.

3. The device of claim 1,
    wherein a pore size of the first porous body is 1 µm or less.

4. The device of claim 1, further comprising:
    a photoelectric conversion body having a first surface connected to the reduction electrode and a second surface connected to the oxidation electrode.

5. The device of claim 1, further comprising:
    an ion exchange membrane provided between the first storage part and the second storage part.

6. The device of claim 1,
    wherein the first porous body includes a hollow fiber membrane, the membrane including:
    a first porous film;
    a second porous film; and
    a non-porous film between the first and second porous films.

7. The device of claim 1,
    wherein the first porous body extends in parallel with a bottom of the third storage part.

* * * * *